No. 873,891. PATENTED DEC. 17, 1907.
H. PAULING.
PROCESS FOR THE PRODUCTION OF NITRIC ACID OR NITRIC OXID
FROM ATMOSPHERIC AIR.
APPLICATION FILED APR. 6, 1906.
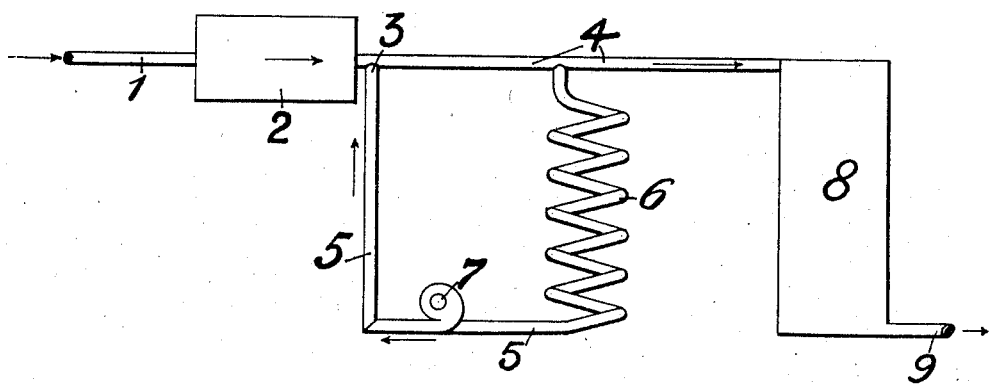
Witnesses:
Inventor:

UNITED STATES PATENT OFFICE.

HARRY PAULING, OF GELSENKIRCHEN, GERMANY, ASSIGNOR TO THE FIRM OF SALPETER-SÄURE-INDUSTRIE-GESELLSCHAFT, G. M. B. H., OF GELSENKIRCHEN, GERMANY.

PROCESS FOR THE PRODUCTION OF NITRIC ACID OR NITRIC OXID FROM ATMOSPHERIC AIR.

No. 873,891.    Specification of Letters Patent.    Patented Dec. 17, 1907.

Application filed April 6, 1906. Serial No. 310,298.

*To all whom it may concern:*

Be it known that I, HARRY PAULING, a subject of the German Emperor, and resident of 84 Wilhelmstrasse, in Gelsenkirchen, in the Province of Westphalia in the Kingdom of Prussia, German Empire, have invented certain new and useful Improvements in Processes for the Production of Nitric Acid or Nitric Oxid from Atmospheric Air, of which the following is a specification.

This invention relates to processes for the production of nitric acid or nitric oxid from atmospheric air.

It has been proposed in connection with such processes, to heat air, or a mixture of air with oxygen, to a temperature of about 1200° C. and then to immediately cool down such heated air by injecting passive or indifferent liquids or blowing passive gases into the air.

According to this invention a cooled off portion of the gases of reaction, that is to say of air that has previously undergone the heating and cooling before mentioned, is employed as a means for cooling the succeeding quantity of air which has been heated to the aforesaid temperature, the object being to prevent the nitrogeneous gases into which the air is converted by heat from getting rarefied by foreign cooling means of the nature above mentioned, as has hitherto been necessary.

The accompanying drawing shows a diagram of an apparatus adapted for effecting my process.

The air to be treated is conducted by a pipe 1 into a device 2 which is suitably heated so that the air it receives is converted into nitrogenous gases. On leaving this device these gases undergo at the place marked 3 the action of a cooled off portion of the gases of reaction before mentioned. The latter arrive from a pipe 4, which the gases enter on leaving the device 2, and through a pipe 5 comprising a suitable cooling device 6 and a fan or the like 7. The latter causes part of the gases of reaction which pass along the pipe 4 to enter the pipe 5, while the cooling device 6 imparts a properly low temperature to such branched current of gases to enable it to act as a cooling means. The main current passing along the pipe 4 is conducted into a suitable device 8 for condensation, where it is converted into nitric acid. The waste gases, which are free from nitric oxids, leave the device 8 by a pipe 9.

What I claim is:

The herein described process, consisting in heating air to a temperature of about 1200° C. and then immediately blowing into the air thus heated a cooled off portion of air previously heated to the said temperature and then immediately cooled down, substantially as set forth.

In witness whereof I have hereunto signed my name this 23d day of February 1906, in the presence of two subscribing witnesses.

HARRY PAULING.

Witnesses:
ULYSSES J. BYWATER,
GEORG KÖNNOR.